United States Patent [19]

Rasmussen

[11] Patent Number: 5,724,763
[45] Date of Patent: Mar. 10, 1998

[54] FISHING ROD HOLDER

[76] Inventor: Marion L. Rasmussen, 2619 Grizzly Hollow Way, Stockton, Calif. 95207

[21] Appl. No.: 645,552

[22] Filed: May 13, 1996

[51] Int. Cl.⁶ ................................................ A01K 97/10
[52] U.S. Cl. .................................................... 43/21.2
[58] Field of Search ........................ 43/21.2; 248/520, 248/534

[56] References Cited

U.S. PATENT DOCUMENTS

| | | | |
|---|---|---|---|
| 3,259,346 | 7/1966 | Rogers | 248/534 |
| 3,306,560 | 2/1967 | Wheeler | 248/534 |
| 3,570,793 | 3/1971 | Shackel | 43/21.2 |
| 3,835,568 | 9/1974 | Whitfield | 43/21.2 |
| 4,235,409 | 11/1980 | Cummings | 248/520 |
| 4,551,939 | 11/1985 | Kitchens | 43/21.2 |
| 4,641,453 | 2/1987 | Roberts | 43/21.2 |
| 5,044,597 | 9/1991 | Walczak | 43/21.2 |
| 5,184,797 | 2/1993 | Hurner | 43/21.2 |
| 5,313,734 | 5/1994 | Roberts | 43/21.2 |

*Primary Examiner*—Kurt Rowan

[57] ABSTRACT

A fishing shaft holder comprising a trough-like support for a fishing rod having parallel side plates and with upper edges and lower edges and with a pair of integrally formed straps coupling the lower edges of the plates in a fixed orientation for receiving the handle portion of a fishing rod. The upper edge of the plates have complimentary recesses for receiving portions of the fishing rod handle being supported for precluding linear movement. The side plates have an upper edge for the passage of a leading edge of a fishing rod therefrom and a lower edge with pairs of concentric apertures passing through the plates at spaced locations adjacent to the leading edge of the plates. An annular base of a cylindrical configuration is provided with a flange at the upper extent integrally formed therewith. The base has spaced axial apertures extending therethrough. A shaft is provided and has a long linear lower extent positionable in the aperture of the bushing with diametric apertures extending therethrough at spaced locations above the bushing and below the base. The shaft has an upper end curved with a horizontal portion positionable through preselected aligned apertures in the plates.

4 Claims, 3 Drawing Sheets

FISHING ROD HOLDER

BACKGROUND OF THE INVENTION

1. Field of the Invention

The present invention relates to a fishing rod holder and, more particularly, pertains to supporting a fishing rod with a holder having swiveling and nodding capabilities.

2. Description of the Prior Art

The use of fishing rods and supports of various designs and configurations is known in the prior art. More specifically, fishing rods and supports of various designs and configurations heretofore devised and utilized for the purpose of assisting fishermen through devices for allowing the identification of a bite through various methods and apparatuses are known to consist basically of familiar, expected and obvious structural configurations, notwithstanding the myriad of designs encompassed by the crowded prior art which have been developed for the fulfillment of countless objectives and requirements.

By way of example, the prior art in U.S. Pat. No. 5,321,904 to Benson discloses a fishing pole holder assembly.

U.S. Pat. No. 5,245,778 to Callegos et al., discloses a fishing pole holder and hook device.

U.S. Pat. No. 5,185,949 to Patterson discloses a fish alert.

U.S. Pat. No. 4,253,262 to Johnson discloses an ice fishing tipup.

U.S. Pat. No. 5,269,088 to Slaback, Jr., et al., discloses a fish pole holding and signaling device.

Lastly, U.S. Pat. No. 5,293,710 to Mills discloses a fishing pole strike indicator.

In this respect, the according to the present invention substantially departs from the conventional concepts and designs of the prior art, and in so doing provides an apparatus primarily developed for the purpose of supporting a fishing rod with a holder having swiveling and nodding capabilities.

Therefore, it can be appreciated that there exists a continuing need for new and improved which can be used for supporting a fishing rod with a holder having swiveling and nodding capabilities. In this regard, the present invention substantially fulfills this need.

SUMMARY OF THE INVENTION

In view of the foregoing disadvantages inherent in the known types of fishing rods and supports of various designs and configurations now present in the prior art, the present invention provides an improved. As such, the general purpose of the present invention, which will be described subsequently in greater detail, is to provide a new and improved apparatus and method which has all the advantages of the prior art and none of the disadvantages.

To attain this, the present invention essentially comprises a new and improved fishing rod holder with swiveling and nodding capabilities, comprising, in combination, a trough-like support for a fishing rod having parallel side plates and with upper edges and lower edges and with a pair of integrally formed straps coupling the lower edges of the plates in a fixed orientation for receiving the handle portion of a fishing rod. The upper edge of the plates have complimentary recesses for receiving portions of the fishing rod handle being supported for precluding linear movement. The side plates have an upper edge for the passage of a leading edge of a fishing rod therefrom and a lower edge for the passage of the trailing edge of a fishing rod handle therefrom with pairs of concentric apertures passing through the plates at spaced locations adjacent to the leading edge of the plates. An annular base of a cylindrical configuration and a flange are provided at the upper extent integrally formed therewith. The base has spaced axial apertures extending therethrough. An associated metal bushing with a central aperture is removably received in the aperture of the base and a radially enlarged shoulder positioned on the upper surface of the base. A shaft is provided and has a long linear lower extent positionable in the aperture of the bushing with diametric apertures extending therethrough at spaced locations above the bushing and below the base. The shaft has an upper end curved with a horizontal portion positionable through preselected aligned apertures in the plates and with an aperture at the free end of the upper end and a cotter pin extending therethrough. An upper cotter pin and a lower cutter pin extend through the upper and lower apertures of the shaft for supporting the shaft in a preselected position with respect to the bushing. A lanyard is provided and has releasable coupling means at its opposed ends for attachment to the cotter pins extending through the shaft for securement purposes.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved which has all the advantages of the prior art fishing rods and supports of various designs and configurations and none of the disadvantages.

It is another object of the present invention to provide a new and improved which may be easily and efficiently manufactured and marketed.

It is a further object of the present invention to provide a new and improved which is of a durable and reliable construction.

An even further object of the present invention is to provide a new and improved which is susceptible of a low cost of manufacture with regard to both materials and labor, and which accordingly is then susceptible of low prices of sale to the consuming public, thereby making such fishing rods and supports of various designs and configurations economically available to the buying public.

Still yet another object of the present invention is to provide a new and improved which provides in the apparatuses and methods of the prior art some of the advantages thereof, while simultaneously overcoming some of the disadvantages normally associated therewith.

Still another object of the present invention is to support a fishing rod with a holder having swiveling and nodding capabilities.

Lastly, it is an object of the present invention to provide a new and improved fishing rod shaft holder, comprising a trough-like support for a fishing rod having parallel side plates and with upper edges and lower edges and with a pair of integrally formed straps coupling the lower edges of the plates in a fixed orientation for receiving the handle portion of a fishing rod. The upper edge of the plates have complimentary recesses for receiving portions of the fishing rod handle being supported for precluding linear movement. The side plates have an upper edge for the passage of a leading edge of a fishing rod therefrom and a lower edge with pairs of concentric apertures passing through the plates at spaced locations adjacent to the leading edge of the plates. An annular base of a cylindrical configuration is provided with a flange at the upper extent integrally formed therewith. The base has spaced axial apertures extending therethrough. A shaft is provided and has a long linear lower extent positionable in the aperture of the bushing with diametric apertures extending therethrough at spaced locations above the bushing and below the base. The shaft has an upper end curved with a horizontal portion positionable through preselected aligned apertures in the plates.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

Similar reference characters refer to similar parts throughout the several views of the drawings.

DESCRIPTION OF THE PREFERRED EMBODIMENT

Figure 1:
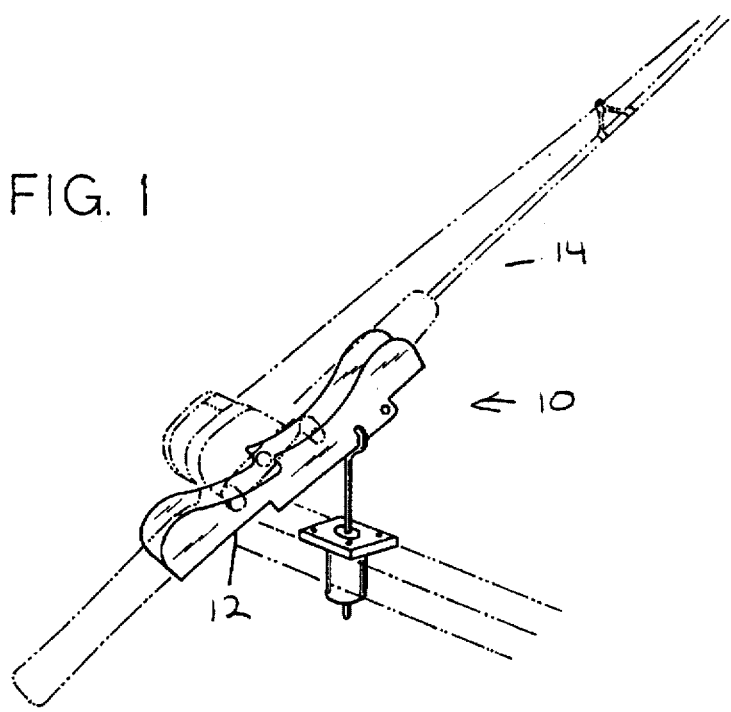
FIG. 1 is a perspective illustration of the preferred embodiment of the fishing rod holder constructed in accordance with the principles of the present invention.
Figure 2:
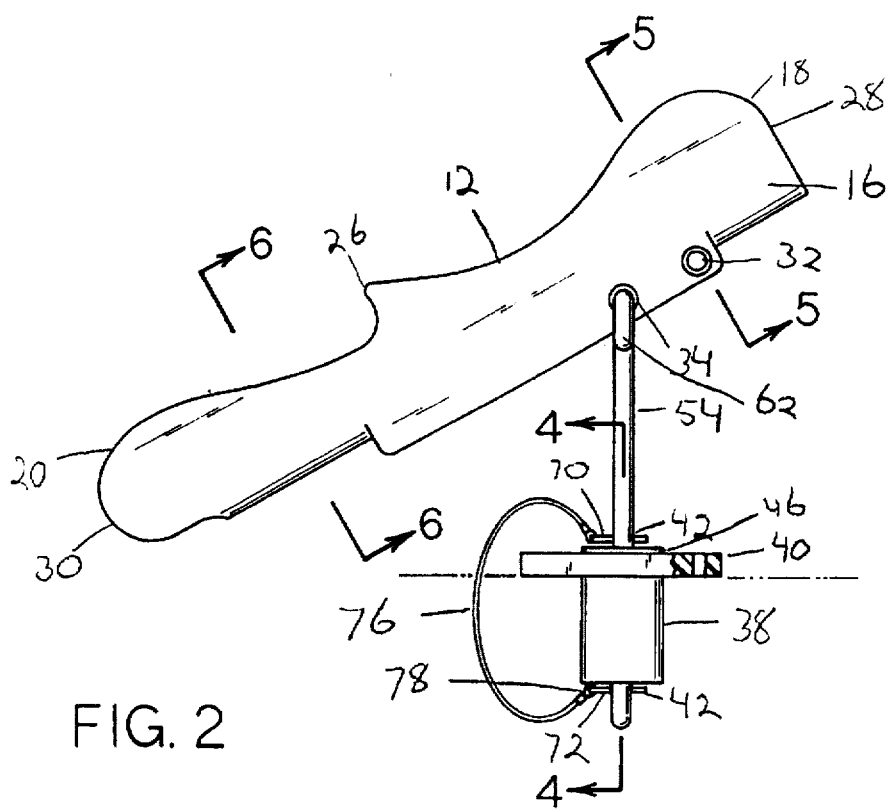
FIG. 2 is a side elevational view of the device shown in FIG. 1.
Figure 3:
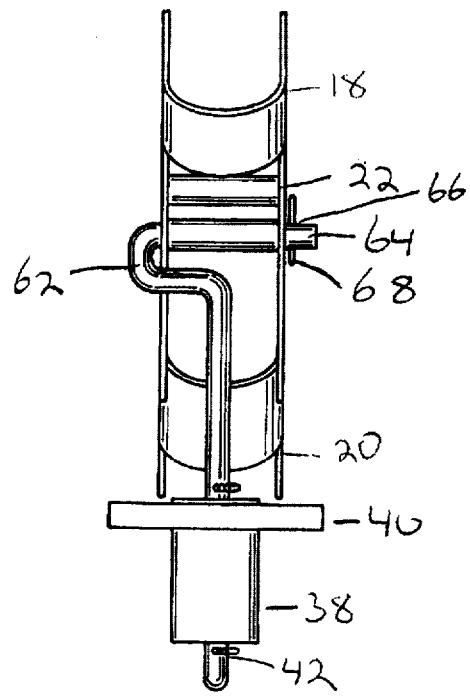
FIG. 3 is an end elevational view of the device shown in FIGS. 1 and 2.
Figure 4:
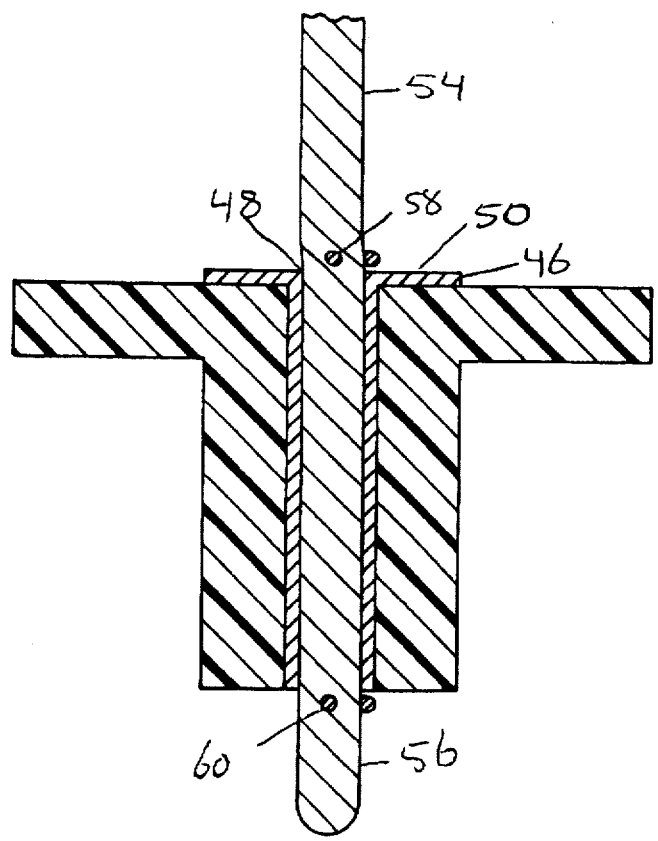
FIG. 4 is a cross sectional view taken along line 4—4 of FIG. 2.
Figure 5:
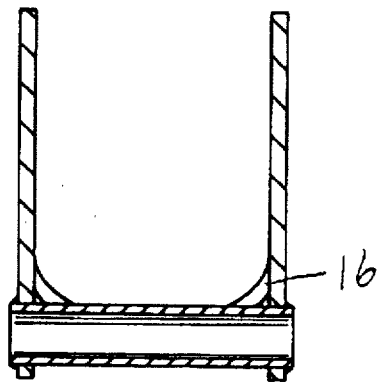
FIG. 5 is a cross sectional view taken along line 5—5 of FIG. 2.
Figure 6:
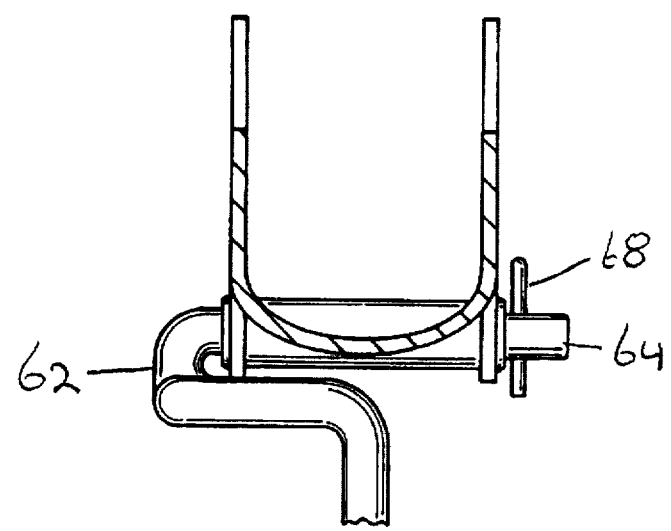
FIG. 6 is a cross sectional view taken along line 6—6 of FIG. 2.

With reference now to the drawings, and in particular to FIG. 1 thereof, a new and improved embodying the principles and concepts of the present invention and generally designated by the reference numeral 10 will be described.

The present invention, the new and improved fishing rod holder, is comprised of a plurality of components. Such components in their broadest context include a trough-like support, a base and a shaft. Such components are individually configured and correlated with respect to each other so as to attain the desired objective.

More specifically, the central component of the system 10 of the present invention is a trough-like support 12. Such support is for a fishing rod 14. The support has parallel side plates 16. Each side plate has an upper edge 18 and a lower edge 20. A pair of integrally formed rigid straps 22 couple the lower edges of the plates in a fixed orientation. Their function is for receiving the handle portion of the fishing rod.

The upper edges of the plates have complimentary recesses 26. Such recesses are for receiving portions of the fishing rod handle being supported and function to preclude linear movement of the fishing rod. The side plates also have edge 28 for the passage of the leading edge of the fishing rod therefrom. The side plates also have trailing edges 30 for the passage of the trailing edge of the fishing rod handle therefrom. In addition, pairs of concentric apertures 32, 34 are formed to pass through the plates at spaced locations adjacent to the leading edge of the plate.

Next provided is an annular base 38. The annular base is of a cylindrical configuration. It has a flange 40 at its upper extent. Such flange is integrally formed with the base. The base also has spaced axial apertures 42. Such apertures extend through the base.

An associated metal bushing 46 is next provided. Such bushing has a central aperture 48 removably received in the aperture of the base. The bushing also has a radial enlarged shoulder 50. Such shoulder is positioned on the upper surface of the base.

The next component of the system 10 is a shaft 54. Such shaft has a long linear lower extent 56. Such extent is positionable in the aperture of the bushing. It also has diametric apertures 58, 60 extending through the shaft. Such apertures are at spaced locations above the bushing and below the base. The shaft also has an upper end 62 which is curved and has a further horizontal portion 64. The horizontal portion is positionable through preselected aligned apertures in the plates. In addition, an aperture 66 at the free end of the upper end of the shaft is provided. A cotter pin 68 extends through such aperture. Securement is effected through an upper cotter pin 70 and a lower cotter pin 72. Such pins extend through the upper and lower apertures of the shaft. The purpose of the cotter pins is supporting the shaft in a preselected position with respect to the bushing.

Lastly provided is a lanyard 76. Such lanyard has releasable coupling components 78 at its supposed ends. Such coupling components are for attachment to the cotter pins extending through the shaft for securement purposes.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A new and improved fishing rod holder with swiveling and nodding capabilities, comprising, in combination:

a trough-like support for a fishing rod having parallel side plates and with upper edges and lower edges and with a pair of integrally formed straps coupling the lower edges of the plates in a fixed orientation for receiving the handle portion of a fishing rod, the upper edge of the plates having complimentary recesses for receiving portions of the fishing rod handle being supported for precluding linear movement, the side plates having a leading edge for the passage of a leading edge of a fishing rod therefrom and a trailing edge for the passage of the trailing edge of a fishing rod handle therefrom with pairs of concentric apertures passing through the plates at spaced locations adjacent to the leading edge of the plates;

an annular base of a cylindrical configuration and a flange at the upper extent integrally formed therewith, the base having spaced axial apertures extending therethrough;

an associated metal bushing with a central aperture removably received in the aperture of the base and a radially enlarged shoulder positioned on the upper surface of the base;

a shaft having a long linear lower extent positionable in the aperture of the bushing with diametric apertures extending therethrough at spaced locations above the bushing and below the base, the shaft having an upper end curved with a horizontal portion positionable through preselected aligned apertures in the plates and with an aperture at the free end of the upper end and a cotter pin extending therethrough;

an upper cotter pin and a lower cutter pin extending through the upper and lower apertures of the shaft for supporting the shaft in a preselected position with respect to the bushing; and a lanyard having releasable coupling means at its opposed ends for attachment to the cotter pins extending through the shaft for securement purposes.

2. A fishing shaft holder comprising:

a trough-like support for a fishing rod having parallel side plates and with upper edges and lower edges and with a pair of integrally formed straps coupling the lower edges of the plates in a fixed orientation for receiving the handle portion of a fishing rod, the upper edge of the plates having complimentary recesses for receiving portions of the fishing rod handle being supported for precluding linear movement, the side plates having a leading edge for the passage of a leading edge of a fishing rod therefrom and a trailing edge with pairs of concentric apertures passing through the plates at spaced locations adjacent to the leading edge of the plates;

an annular base of a cylindrical configuration and a flange at the upper extent integrally formed therewith, the base having spaced axial apertures extending therethrough with associated bushings disposed therein; and a shaft having a long linear lower extent positionable in the bushing with diametric apertures extending therethrough at spaced locations above the bushing and below the base, the shaft having an upper end curved with a horizontal portion positionable through preselected aligned apertures in the plates.

3. The fishing rod holder as set forth in claim 2 and further including an upper cotter pin and a lower cotter pin extending through the upper and lower apertures of the shaft for supporting the shaft in a preselected position with respect to the bushing.

4. The fishing rod holder as set forth in claim 2 and further including a lanyard having releasable coupling means at its opposed ends for attachment to the cotter pins extending through the shaft for securement purposes.

* * * * *